United States Patent
Choi

(10) Patent No.: US 11,037,471 B2
(45) Date of Patent: Jun. 15, 2021

(54) DISPLAY DEVICE HAVING STRESS-RELIEVING MEMBERS

(71) Applicant: Samsung Display Co., Ltd., Yongin-Si (KR)

(72) Inventor: Kyungmin Choi, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/556,617

(22) Filed: Aug. 30, 2019

(65) Prior Publication Data

US 2020/0175897 A1    Jun. 4, 2020

(30) Foreign Application Priority Data

Dec. 4, 2018   (KR) .......................... 10-2018-0154339

(51) Int. Cl.
| | |
|---|---|
| *G06F 1/16* | (2006.01) |
| *G09F 9/30* | (2006.01) |
| *H04M 1/02* | (2006.01) |
| *H05K 5/00* | (2006.01) |

(52) U.S. Cl.
CPC ............ *G09F 9/301* (2013.01); *G06F 1/1652* (2013.01); *G06F 1/1681* (2013.01); *H04M 1/0268* (2013.01); *H05K 5/0017* (2013.01)

(58) Field of Classification Search
CPC .... G06F 1/1652; G06F 1/1681; G06F 1/1616; G06F 1/1641; G06F 1/1618; H04M 1/0268; G09F 9/301; H05K 5/0017
See application file for complete search history.

(56) References Cited

U.S. PATENT DOCUMENTS

| | | | |
|---|---|---|---|
| 9,686,837 B1 | 6/2017 | Yang et al. | |
| 9,874,904 B2 | 1/2018 | Xu | |
| 9,894,782 B2 | 2/2018 | Dong | |
| 10,013,028 B2 | 7/2018 | Ahn | |
| 2016/0366772 A1* | 12/2016 | Choi | G06F 1/1652 |
| 2018/0077806 A1 | 3/2018 | Harmon et al. | |
| 2018/0104943 A1* | 4/2018 | Chen | B32B 37/10 |
| 2018/0192527 A1 | 7/2018 | Yun et al. | |
| 2019/0082528 A1* | 3/2019 | Zhang | H05K 1/028 |

FOREIGN PATENT DOCUMENTS

| | | |
|---|---|---|
| CN | 103914273 | 7/2014 |
| KR | 10-2017-0069775 | 6/2017 |

* cited by examiner

*Primary Examiner* — James Wu
(74) *Attorney, Agent, or Firm* — F. Chau & Associates, LLC

(57) ABSTRACT

A display device may include a display panel including a folding area, first and second non-display areas, and first and second non-folding areas arranged in a first direction. A plurality of stress-relieving members are arranged in the first direction and are disposed on rear surfaces of the first and second non-display areas. The stress-relieving members may extend in a second direction crossing the first direction. First and second supporting members are disposed on rear surfaces of the first and second non-folding areas, respectively. When the display panel is folded along a folding axis overlapped with the folding area and extended in the second direction, the first and second non-display areas may be bent by surfaces of each of the stress-relieving members contacting each other, and a bending direction of each of the first and second non-display areas is opposite to a bending direction of the folding area.

26 Claims, 15 Drawing Sheets

DISPLAY DEVICE HAVING STRESS-RELIEVING MEMBERS

CROSS-REFERENCE TO RELATED APPLICATION

This application claims priority under 35 U.S.C. § 119 to Korean Patent Application No. 10-2018-0154339, filed on Dec. 4, 2018, in the Korean Intellectual Property Office, the disclosure of which is incorporated by reference in its entirety herein.

1. TECHNICAL FIELD

The present disclosure relates to a display device, and in particular, to a display device, which is configured to prevent a display panel from being deformed.

2. DISCUSSION OF RELATED ART

Numerous electronic products, such as smart phones, digital cameras, notebook computers, navigation systems, and smart televisions have a display device for displaying an image to a user. The display device generates an image and provides the image to a user through a screen.

Many new technologies for display devices have been developed recently. An example of such a display device is a flexible display device that may be curvedly deformed, folded, or rolled. Since a shape of the flexible display device may be variously changed, the use of the flexible display device allows for improvement in portability and user convenience.

A folding display device, which is a type of flexible display device that has been developed may be folded along a folding axis extending in a specific direction. However, the folding display device suffers from various technical issues, which do not occur in conventional display devices.

SUMMARY

An exemplary embodiment of the present inventive concepts provides a display device configured to prevent a display panel from being deformed.

According to an exemplary embodiment of the present inventive concepts, a display device includes a folding area, a first non-display area, a second non-display area, a first non-folding area disposed between the first non-display area and the folding area, and a second non-folding area disposed between the second non-display area and the folding area. The folding area, the first and second non-display areas, and the first and second non-folding areas are arranged in a first direction. A plurality of stress-relieving members is disposed on rear surfaces of the first and second non-display areas. The plurality of stress-relieving members extend in a second direction crossing the first direction and are arranged in the first direction. A first supporting member is disposed on a rear surface of the first non-folding area. A second supporting member is disposed on a rear surface of the second non-folding area. When the display panel is folded along a folding axis overlapped with the folding area and extended in the second direction, the first and second non-display areas are bent by surfaces of each of the stress-relieving members contacting each other. A bending direction of each of the first and second non-display areas is opposite to a bending direction of the folding area.

According to an exemplary embodiment of the present inventive concepts, a display device includes a display panel having a folding area that is configured to fold along a folding axis and at least one non-display area. A plurality of stress-relieving members is attached to a rear surface of at least one of the at least one non-display area. A first supporting member is disposed adjacent to the plurality of stress-relieving members. The first supporting member is not overlapping the at least one non-display area having the stress-relieving members. When the display panel is folded along the folding axis, the at least one non-display area having stress-relieving members is bent by surfaces of each of the stress-relieving members contacting each other. The bending direction of the at least one non-display area having stress-relieving members is opposite to a bending direction of the folding area.

A display device includes a display panel including a folding area, a first non-display area, a second non-display area, a first non-folding area disposed between the first non-display area and the folding area, and a second non-folding area disposed between the second non-display area and the folding area. The folding area, the first and second non-display areas, and the first and second non-folding areas are arranged in a first direction. A stress-relieving member is disposed on a rear surface of the display panel. A first supporting member is disposed on a rear surface of the stress-relieving member overlapped with the first non-folding area. A second supporting member is disposed on a rear surface of the stress-relieving member overlapped with the second non-folding area. A third supporting member is disposed on a rear surface of the first supporting member and extends to an area overlapped with the first non-display area. A fourth supporting member is disposed on a rear surface of the second supporting member and extends to an area overlapped with the second non-display area. When the display panel is folded along a folding axis, the first and second non-display areas are bent to move end portions of the first and second non-display areas towards the third and fourth supporting members, respectively, and a bending direction of each of the first and second non-display areas is opposite to a bending direction of the folding area. The folding axis is overlapped with the folding area and is extended in the second direction.

BRIEF DESCRIPTION OF THE DRAWINGS

Example embodiments will be more clearly understood from the following brief description taken in conjunction with the accompanying drawings. The accompanying drawings represent non-limiting, exemplary embodiments as described herein.

Figure 1:
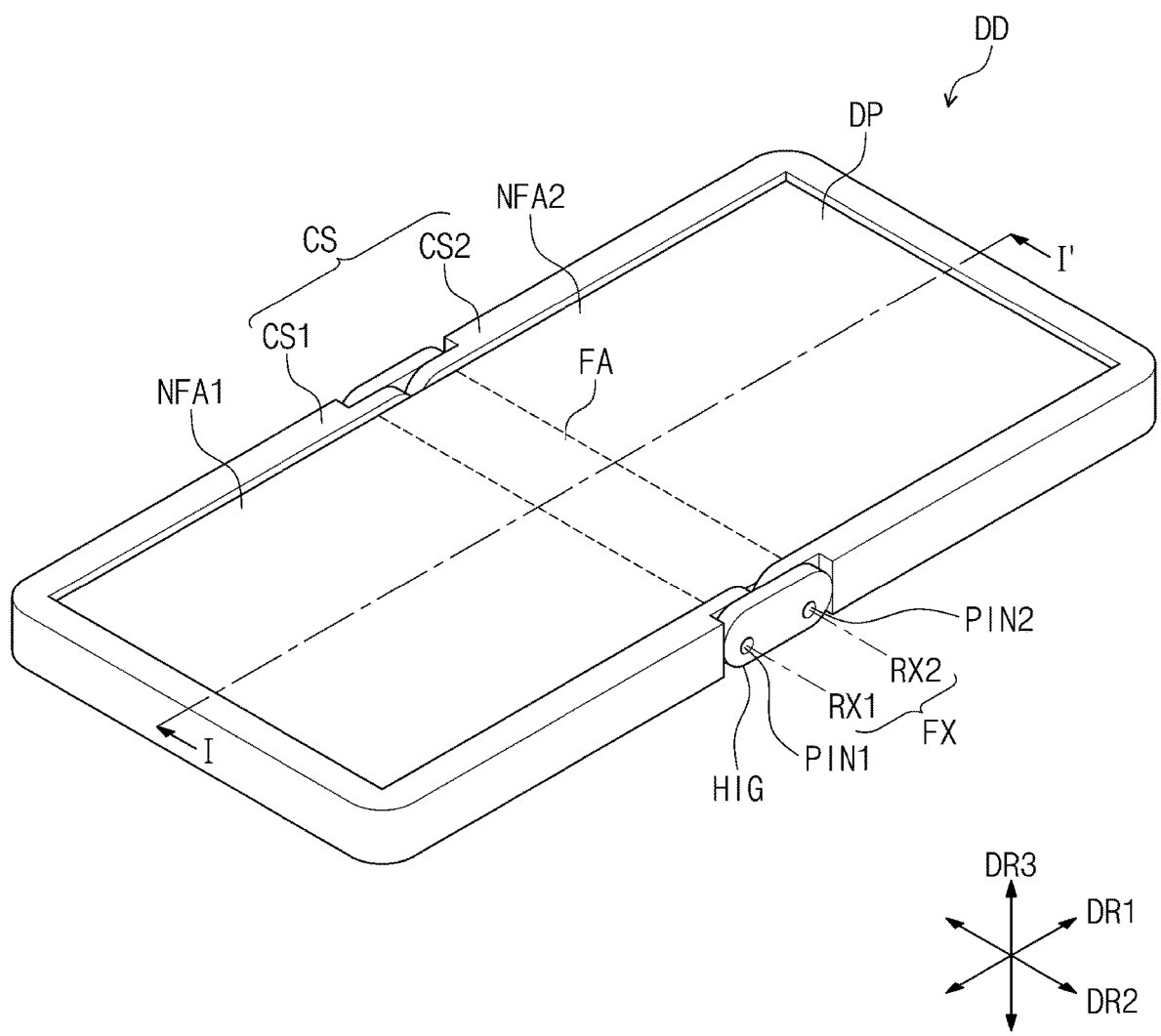
FIG. 1 is a perspective view illustrating a display device according to an exemplary embodiment of the present inventive concepts.

It should be noted that these figures are intended to illustrate the general characteristics of methods, structure and/or materials utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, areas and/or structural elements may be reduced or exaggerated for clarity.

DETAILED DESCRIPTION

Exemplary embodiments of the present inventive concepts will now be described more fully with reference to the accompanying drawings, in which example embodiments are shown. However, exemplary embodiments of the present inventive concepts may be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and areas may be exaggerated for clarity. Like reference numerals in the drawings denote like elements, and thus their description will be omitted.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Therefore, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments of the inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments of the present inventive concepts should not be construed as limited to the particular shapes of areas illustrated herein but are to include deviations in shapes that result, for example, from manufacturing.

Unless otherwise defined, all terms (including technical and scientific terms) used herein have the same meaning as commonly understood by one of ordinary skill in the art to which exemplary embodiments of the present inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
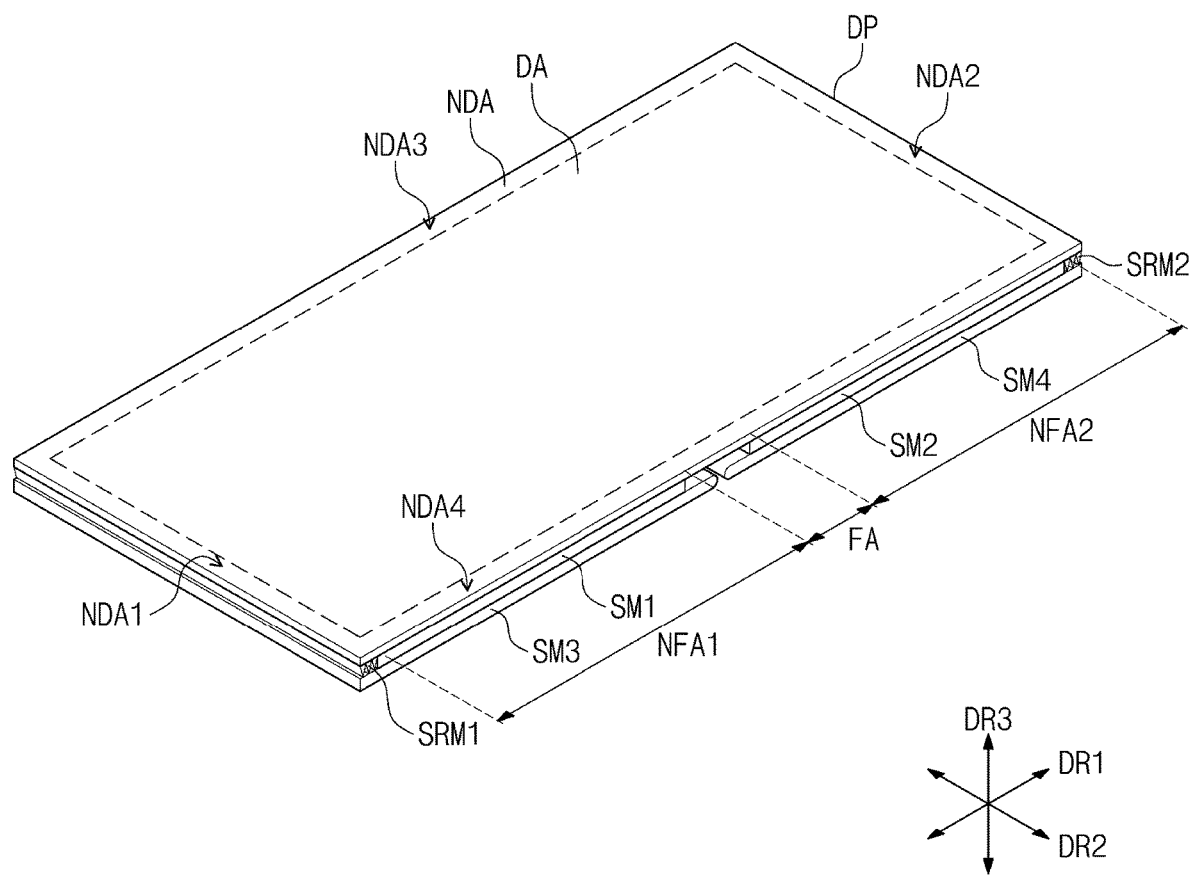
FIG. 2 is a perspective view illustrating a display panel, a plurality of supporting members, and a plurality of stress-relieving members, which are contained in a case member of FIG. 1 according to an exemplary embodiment of the present inventive concepts.
Figure 3:
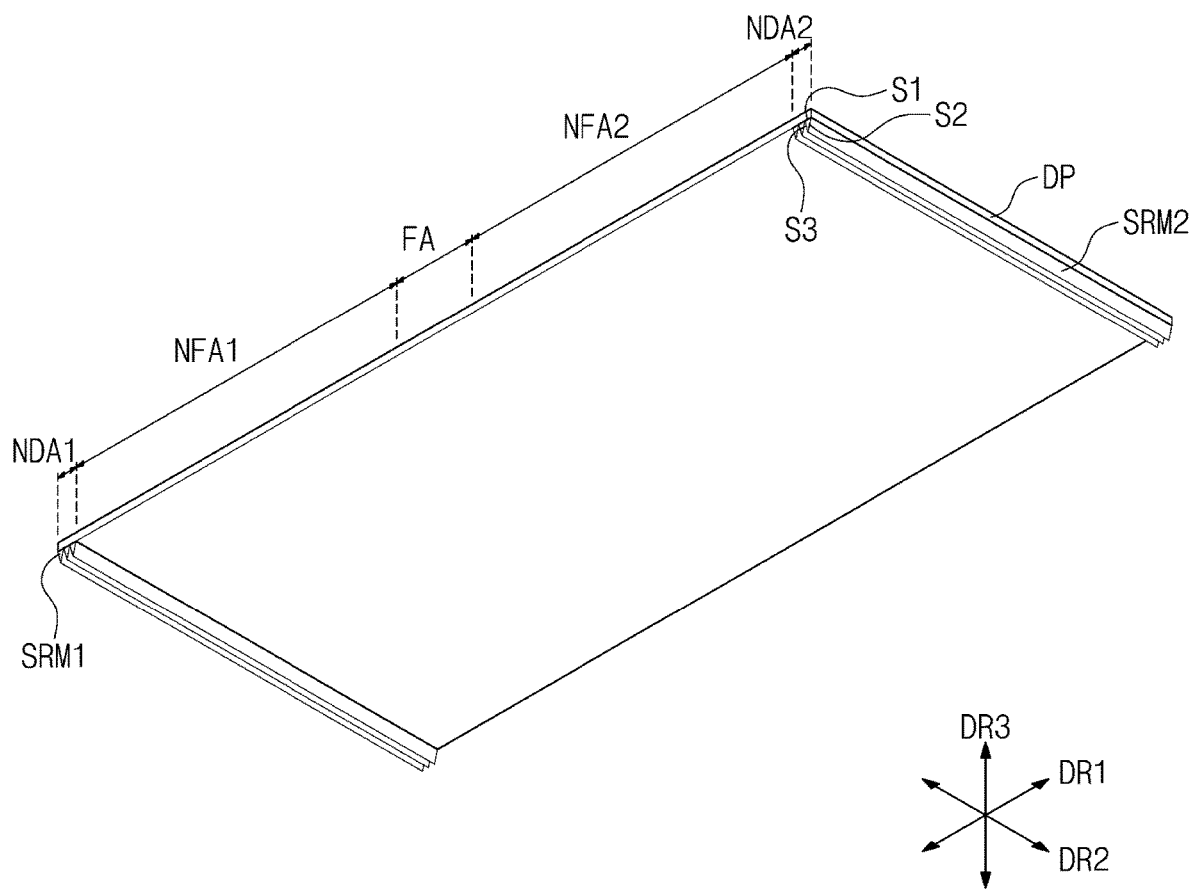
FIG. 3 is a bottom perspective view illustrating stress-relieving members, which are disposed on a rear surface of the display panel of FIG. 2 according to an exemplary embodiment of the present inventive concepts.

FIG. 1 is a perspective view illustrating a display device according to an exemplary embodiment of the present inventive concepts. FIG. 2 is a perspective view illustrating a display panel, a plurality of supporting members, and a plurality of stress-relieving members, which are contained in a case member of FIG. 1. FIG. 3 is a bottom perspective view illustrating stress-relieving members, which are disposed on a rear surface of the display panel of FIG. 2.

Referring to FIG. 1, a display device DD according to an exemplary embodiment of the present inventive concepts may include a display panel DP, a case member CS which houses the display panel DP, and a hinge member HIG, which is connected to the case member CS to provide a folding axis FX for the display device DD.

The display panel DP may have a surface or plane that is defined by a first direction DR1 and a second direction DR2 crossing each other. Hereinafter, a third direction DR3 will be defined as a direction that is perpendicular to both of the first and second directions DR1 and DR2. The display panel DP may be a flexible display panel.

The display panel DP may include a folding area FA and a plurality of non-folding areas NFA1 and NFA2. The folding area FA may be disposed between the non-folding areas NFA1 and NFA2. The folding area FA and the non-folding areas NFA1 and NFA2 may be arranged in the first direction DR1.

Although one folding area FA and two non-folding areas NFA1 and NFA2 are illustrated in the exemplary embodiment shown in FIG. 1, the present inventive concepts are not limited to the numbers of the folding area FA and the non-folding areas NFA1 and NFA2. For example, the display panel DP may include two or more non-folding areas and a plurality of folding areas disposed between the non-folding areas.

The case member CS may include a first case member CS1 and a second case member CS2, which are arranged in the first direction DR1. The first case member CS1 and the second case member CS2 may be connected to each other to house the display panel DP.

The hinge member HIG may be connected to a proximal portion of the first case member CS1 and a proximal portion of the second case member CS2, which are opposite to each other. For example, a first pin unit PIN1 and a second pin unit PIN2 may be inserted in apertures in the body of the hinge member HIG. The first pin unit PIN1 may extend from an aperture in the body of the hinge member HIG through an aperture in the proximal portion of the first case member CS1. The second pin unit PIN2 may be extend from an aperture in the body of the hinge member HIG through an aperture in the proximal portion of the second case member CS2. Accordingly, the hinge member HIG may be connected to the first and second case members CS1 and CS2 by the first and second pin units PIN1 and PIN2.

The hinge member HIG may provide the folding axis FX for the display device DD. The folding axis FX may be parallel to the second direction DR2. The display device DD may be folded along the folding axis FX. Although the folding axis FX is illustrated to extend in the relatively short axis direction of the display panel DP, a folding axis extending in a longitudinal axis direction of the display panel DP may be provided for the display device. In this embodiment, first and second cases arranged in the second direction DR2 may be used, and a hinge member connected to the first and second cases may provide a folding axis for the display device DD that is parallel to the first direction DR1.

The folding axis FX may include a first rotating axis RX1 and a second rotating axis RX2. The first rotating axis RX1 and second rotating axis RX2 extend in the second direction DR2 and are adjacent to each other. In this embodiment, the folding axis FX may provide two rotating axes to the display device DD. However, the present inventive concepts are not limited to this exemplary embodiment and the folding axis FX may provide a single rotating axis to the display device DD, and the rotating axis and the folding axis may be the same. In other embodiments, three or more rotating axes may be included in the display device DD.

The folding area FA may be overlapped with the first and second rotating axes RX1 and RX2, and the display device DD may be folded along the first rotating axis RX1 and the second rotating axis RX2. The first rotating axis RX1 may be defined by the first pin unit PIN1, and the second rotating axis RX2 may be defined by the second pin unit PIN2. The first and second pin units PIN1 and PIN2 may extend in the second direction DR2.

The first and second case members CS1 and CS2 connected to the hinge member HIG may be rotated along the first and second rotating axes RX1 and RX2, respectively. The display panel DP, which is housed in the first and second case members CS1 and CS2, may be folded by the rotation of the first and second case members CS1 and CS2 along the first and second rotating axes RX1, RX2, respectively.

Referring to FIGS. 2 and 3, the display device DD may include a plurality of supporting members and at least one stress-relieving member. For example, in FIGS. 2-3, the display device DD includes first to fourth supporting members SM1-SM4, and a plurality of stress-relieving members SRM1 and SRM2, in addition to the display panel DP. The display panel DP may have a rectangular shape whose long sides are parallel to the first direction DR1 and whose short sides are parallel to the second direction DR2. However, exemplary embodiments of the present inventive concepts are not limited to the specific shape of the display panel DP and the display panel may have various shapes.

The display panel DP may include a display area DA and a non-display area NDA surrounding the display area DA. In an exemplary embodiment, the non-display area NDA may include first, second, third, and fourth non-display areas NDA1, NDA2, NDA3, and NDA4.

For example, the non-display areas may be disposed from an edge of the display device to an edge of the display area DA. The first non-display area NDA1 and the second non-display area NDA2 may be opposite to each other in the first direction DR1 and may be adjacent to the relatively short edges of the display panel DP. The third non-display area NDA3 and the fourth non-display area NDA4 may be opposite to each other in the second direction DR2 and may be adjacent to the long edges of the display panel DP.

In the exemplary embodiment shown in FIG. 1, the folding area FA may be disposed between the first non-display area NDA1 and the second non-display area NDA2. As shown in FIG. 2, the non-folding areas NFA1 and NFA2 may include the first non-folding area NFA1 disposed between the first non-display area NDA1 and the folding area FA and the second non-folding area NFA2 disposed between the second non-display area NDA2 and the folding area FA.

The folding area FA and the first and second non-folding areas NFA1 and NFA2 may overlap with the display area DA and the third and fourth non-display areas NDA3 and NDA4. The first and second non-display areas NDA1 and NDA2 may not form a portion of the non-folding areas NFA1 and NFA2. The folding area FA, the first non-folding area NFA1, the second non-folding area NFA2, the first non-display area NDA1, and the second non-display area NDA2 may be arranged in the first direction DR1.

A front surface of the display panel DP may be defined as the surface that displays an image to a user in the display area DA. The opposite surface of the front surface of the display panel DP may be defined as the rear surface of the display panel DP. The front surfaces of the first and second supporting members SM1 and SM2 may face the rear surface of the display panel DP, whereas opposite surfaces of the front surfaces of the first and second supporting members SM1 and SM2 may be defined as the rear surfaces of the first and second supporting members SM1 and SM2.

The first supporting member SM1 may be disposed on a rear surface of the first non-folding area NFA1. The second supporting member SM2 may be disposed on a rear surface of the second non-folding area NFA2. The first and second supporting members SM1 and SM2 may have proximal ends that extend in the first direction DR1 from an area that overlaps proximal ends of the first and second non-folding areas NFA1, NFA2 in a relatively central portion of the display panel to an area that overlaps an edge of the display area DA. The first and second supporting members SM1 and SM2 may extend in the second direction DR2 from an area that overlaps an edge of the display panel in the third non-display area NDA3 to an area that overlaps an opposing edge of the display panel in the fourth non-display area NDA4. Therefore, the first supporting members SM1 and SM2 may not be disposed in an area overlapping the non-display areas NDA1, NDA2 and a space may be formed in these areas by the absence of the first and second supporting members. The first supporting member SM1 and the second supporting member SM2 may be spaced apart from each other in the first direction DR1 by a specific distance. In an exemplary embodiment, the first and second supporting members SM1 and SM2 may include at least one of metal, glass, or plastic materials.

The first and second supporting members SM1 and SM2 may be attached to the rear surface of the display panel DP. For example, the first and second supporting members SM1 and SM2 may be attached to the display panel by an adhesive material disposed between the first supporting member SM1 and the display panel DP and between the second supporting member SM2 and the display panel DP. As an example, the adhesive material may include a pressure sensitive adhesive (PSA).

The stress-relieving members SRM1 and SRM2 may be disposed on the rear surface of the first non-display area NDA1 and the rear surface of the second non-display area NDA2 adjacent to the first supporting member SM1 and second supporting member SM2, respectively, that are disposed in the display area DA. However, these embodiments are exemplary and in alternative embodiments, the at least one stress-relieving member and the plurality of supporting members may have various different configurations.

The stress-relieving members SRM1 and SRM2 may extend in the second direction DR2 and may be arranged in the first direction DR1. The stress-relieving members SRM1 and SRM2 may be attached to the rear surfaces of the first and second non-display areas NDA1 and NDA2 by an adhesive material.

The stress-relieving members SRM1 and SRM2 may include at least one of elastic materials (e.g., plastic, rubber, and silicone). However, exemplary embodiments of the present inventive concepts are not limited to these materials. For example, the stress-relieving members SRM1 and SRM2 may include a metallic material. A width of each of the stress-relieving members SRM1 and SRM2 may decrease with increasing distance from the rear surface of the display panel DP.

For example, the width of each of the stress-relieving members SRM1 and SRM2 may be smaller at a portion that is spaced apart from the display panel DP in the third direction DR3 than at a portion adjacent to the rear of the display panel DP. For example, in one embodiment, the stress-relieving members SRM1 and SRM2 may have an inverted triangular shape. The width of each of the stress-relieving members SRM1 and SRM2 may be a value measured in the first direction DR1.

The stress-relieving members SRM1 and SRM2 may include a plurality of the first stress-relieving members SRM1, which are disposed below the first non-display area NDA1, and a plurality of second stress-relieving members SRM2, which are disposed below the second non-display area NDA2. The first stress-relieving members SRM1 may be adjacent to the first supporting member SM1. The second stress-relieving members SRM2 may be adjacent to the second supporting member SM2.

Figure 10:
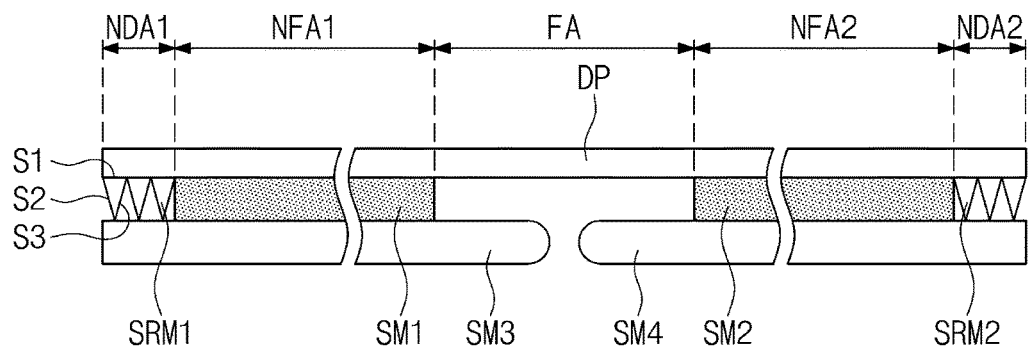
FIG. 10 is an enlarged sectional view illustrating a display panel, first to fourth supporting members, and first and second stress-relieving members according to an exemplary embodiment of the present inventive concepts.

As shown in the FIGS. 3 and 10, each of the first and second stress-relieving members SRM1 and SRM2 may include a first side S1, a second side S2, and a third side S3. The first side S1, the second side S2, and the third side S3 may extend in the second direction DR2. When viewed in the second direction DR2, the second side S2 may extend from an end of the first side S1, and the third side S3 may extend from another end of the first side S1 and may be connected to an end of the second side S2.

For example, in an exemplary embodiment, when viewed in the second direction DR2, the first side S1, the second side S2, and the third side S3 may be connected to each other to form an inverted triangular shape. The first sides S1 of the first and second stress-relieving members SRM1 and SRM2 may be attached to the rear surfaces of the first and second non-display areas NDA1 and NDA2.

The third supporting member SM3 may be disposed below the first non-display area NDA1 and on the rear surface of the first supporting member SM1. The fourth supporting member SM4 may be disposed below the second non-display area NDA2 and on the rear surface of the second supporting member SM2.

In detail, the third supporting member SM3 may be disposed below the first stress-relieving members SRM1 and on the rear surface of the first supporting member SM1. The fourth supporting member SM4 may be disposed below the second stress-relieving members SRM2 and on the rear surface of the second supporting member SM2. The third and fourth supporting members SM3, SM4 may extend in the first direction DR1 from areas overlapping the folding area FA to areas that overlap edges of the display panel DP. Thus, the first stress-relieving members SRM1 may be disposed between the first non-display area NDA1 and the third supporting member SM3. The second stress-relieving members SRM2 may be disposed between the second non-display area NDA2 and the fourth supporting member SM4.

Each of two opposite portions of the proximal ends of the third and fourth supporting members SM3 and SM4 disposed in an area that overlaps the folding area FA may have a curved surface. The third supporting member SM3 and the fourth supporting member SM4 may be spaced apart from each other in the first direction DR1 by a specific distance. The distance between the third supporting member SM3 and the fourth supporting member SM4 may be smaller than the distance between the first supporting member SM1 and the second supporting member SM2.

Figure 4:
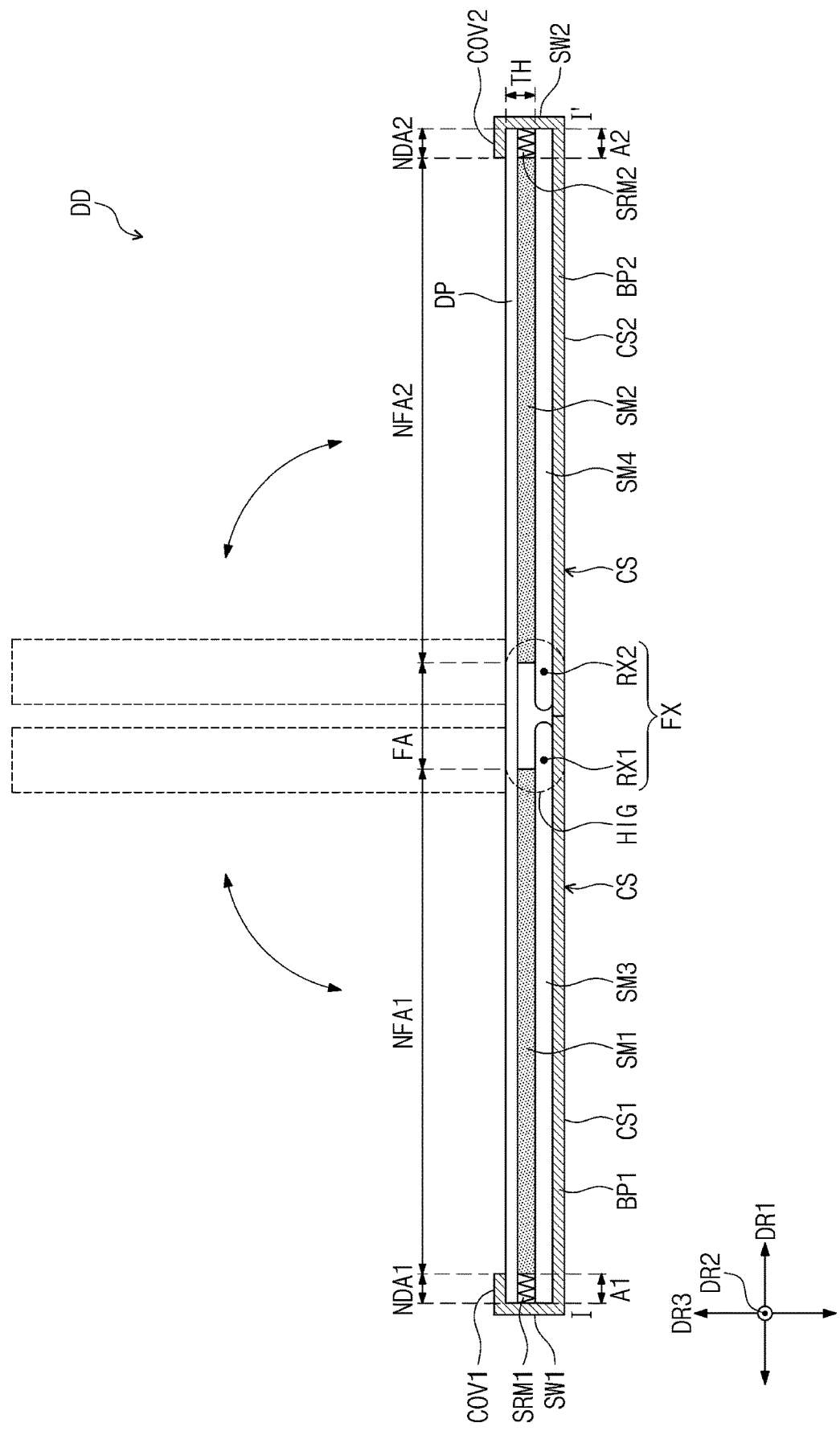
FIG. 4 is a sectional view taken along line I-I' of FIG. 1 according to an exemplary embodiment of the present inventive concepts.

FIG. 4 is a sectional view taken along line I-I' of FIG. 1.

Referring to FIG. 4, the first supporting member SM1 and the second supporting member SM2 may be attached to the rear surface of the display panel DP to protect the display panel DP. For example, the first supporting member SM1 and second supporting member SM2 may be used as a heat-dissipation element to exhaust heat generated in the display panel DP. The third supporting member SM3 and the fourth supporting member SM4 may be defined as a bracket and may provide a surface, to which the case member CS may be attached, during a process of fabricating the display device DD.

The case member CS may house the display panel DP, the first to fourth supporting members SM1-SM4, and the stress-relieving members SRM1 and SRM2. In an exemplary embodiment, the case member CS may cover the non-display area NDA of the display panel DP.

The first case member CS1 may include a first bottom portion BP1, a first sidewall portion SW1, and a first cover portion COV1. The second case member CS2 may include a second bottom portion BP2, a second sidewall portion SW2, and a second cover portion COV2.

The first bottom portion BP1 may be disposed on a rear surface of the third supporting member SM3, and the second bottom portion BP2 may be disposed on a rear surface of the fourth supporting member SM4. The first and second bottom portions BP1 and BP2 may define a bottom portion of the case member CS.

The first sidewall portion SW1 may be disposed on a side surface of the display panel DP adjacent to the first non-display area NDA1. The second sidewall portion SW2 may be disposed on a side surface of the display panel DP adjacent to the second non-display area NDA2. The first and second sidewall portions SW1 and SW2 may be extended along an edge of the display panel DP and may be disposed on side surfaces of the display panel DP adjacent to the third and fourth non-display areas NDA3 and NDA4.

The first cover portion COV1 may be disposed on the first non-display area NDA1 to cover the first non-display area. The second cover portion COV2 may be disposed on the second non-display area NDA2 to cover the second non-display area NDA2. However, in an exemplary embodiment, the first and second cover portions COV1 and COV2 may be omitted and the first and second non-display areas NDA1 and NDA2 may be exposed to the outside.

The first case member CS1 may house the first supporting member SM1, the third supporting member SM3, the first stress-relieving members SRM1, the first non-display area NDA1, and the first non-folding area NFA1. The second case member CS2 may house the second supporting member SM2, the fourth supporting member SM4, the second stress-relieving members SRM2, the second non-display area NDA2, and the second non-folding area NFA2.

The first stress-relieving members SRM1 may be disposed in the space defined between the first non-display area NDA1, the distal end of the first supporting member SM1, and the third supporting member SM3. The second stress-relieving members SRM2 may be disposed in a space defined between the second non-display area NDA2, the distal end of the second supporting member SM2, and the fourth supporting member SM4.

Hereinafter, an area provided for the first stress-relieving members SRM1 will be defined as a first area A1, and an area provided for the second stress-relieving members SRM2 will be defined as a second area A2. When measured in the first direction DR1, a length of the first area A1 may be equal to a length of the second area A2. However, exemplary embodiments of the present inventive concepts are not limited to this example, and the length of the first area A1 may be different from the length of the second area A2.

When measured in the first direction DR1, the length of the first area A1 may be equal to the length of the first non-display area NDA1. However, exemplary embodiments of the present inventive concepts are not limited to this example, and the length of the first area A1 may be less than the length of the first non-display area NDA1. When measured in the first direction DR1, the length of the second area A2 may be equal to the length of the second non-display area NDA2. However, exemplary embodiments of the present inventive concepts are not limited to this example, and the length of the second area A2 may be less than the length of the second non-display area NDA2.

When measured in the first direction DR1, a ratio of the length of each of the first area A1 and the second area A2 to the length of the display panel DP may be about 1:50. In other words, the length of each of the first area A1 and the second area A2 may be about 2% of the length of the display panel DP. However, in other exemplary embodiments the ratio of the length of each of the first area A1 and the second area A2 to the length of the display panel DP may be between 1:20 to 1:80. The length of each of the first area A1 and the second area A2 in the first direction may be equal to a thickness TH, which is a sum of the thickness of the first and second supporting members SM1 and SM2, respectively, and the thickness of the display panel DP measured in the third direction DR3.

The hinge member HIG may include the first and second rotating axes RX1 and RX2 and may provide the folding axis FX overlapped with the folding area FA to the display panel DP. The display panel DP may be rotated and folded along the folding axis FX. However, as described above, exemplary embodiments of the present inventive concepts are not limited to this example, and the folding axis FX may provide a single rotating axis to the display device DD, and the rotating axis and the folding axis may be the same. For convenience in description and illustration, the hinge member HIG is depicted by a dotted line.

The first rotating axis RX1 of the hinge member HIG may be defined at a portion of the third supporting member SM3 near the proximate end of the third supporting member which is adjacent to the opposing proximate end of the fourth supporting member SM4. The second rotating axis RX2 may be defined at a portion of the fourth supporting member SM4 near the proximate end of the fourth supporting member.

The hinge member HIG may be connected not only to the first and second case members CS1 and CS2 but also to the third and fourth supporting members SM3 and SM4. For example, the first and second pin units PIN1 and PIN2 may penetrate the first and second case members CS1 and CS2, may be inserted into the third and fourth supporting members SM3 and SM4, and may be connected to the third and fourth supporting members SM3 and SM4, respectively.

The first and second pin units PIN1 and PIN2 may be respectively inserted in a portion of the third supporting member SM3 near the proximal end of the third supporting member and in a portion of the fourth supporting member SM4 near a proximal end of the fourth supporting member. Therefore, the first and second rotating axes RX1 and RX2 may be defined in the third and fourth supporting members SM3 and SM4.

In the embodiment where the third and fourth supporting members SM3 and SM4 are rotated along the first and second rotating axes RX1 and RX2, the folding area FA may be bent about the folding axis FX and the display panel DP may be folded. For convenience in description and illustration, the folded structure of the display device DD is depicted by a dotted line in the exemplary embodiment shown in FIG. 4.

When the display panel DP is folded, the first and second stress-relieving members SRM1 and SRM2 may relieve a stress exerted on the display panel DP. The function of the first and second stress-relieving members SRM1 and SRM2 will be described in more detail below.

Figure 5:
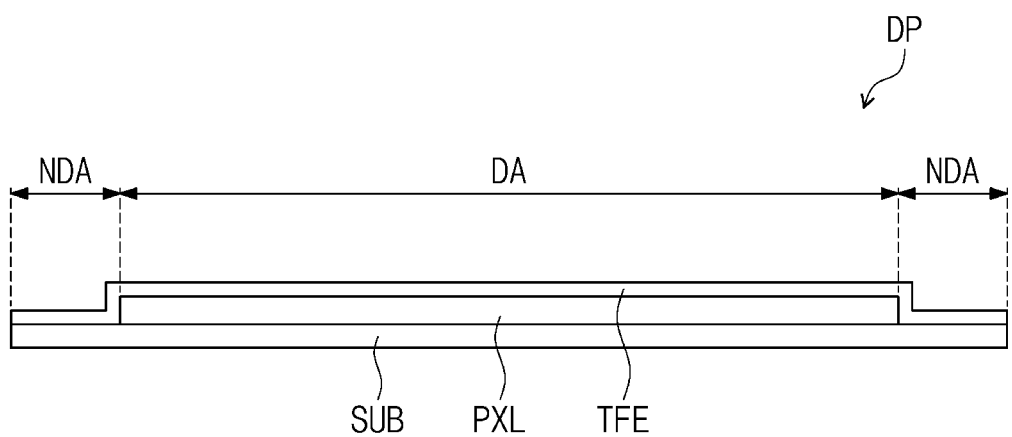
FIG. 5 is a sectional view schematically illustrating the display panel of FIG. 1 according to an exemplary embodiment of the present inventive concepts.

FIG. 5 is a sectional view schematically illustrating the display panel of FIG. 1.

Referring to FIG. 5, the display panel DP may be an organic light emitting display panel. However, the present inventive concepts are not limited to this example, and various image display panels, such as a liquid crystal display panel, an electrowetting display panel, and an electrophoretic display panel, may be used as the display panel DP.

The display panel DP may include a substrate SUB, a pixel layer PXL, disposed on the substrate SUB, and a thin encapsulation layer TFE, which is disposed on the substrate SUB to cover the pixel layer PXL. The substrate SUB may include a transparent substrate, such as a plastic substrate, a glass substrate, or a substrate made of an organic/inorganic composite material. The substrate SUB may include a flexible plastic substrate, and in this embodiment, the substrate SUB may have a flexible property.

As shown in the display panel DP of FIG. 5, the substrate SUB may include a display area DA and a non-display area NDA around the display area DA. The pixel layer PXL may be disposed on the display area DA. The pixel layer PXL may include a plurality of pixels, each of which includes a light-emitting element.

The thin encapsulation layer TFE may include at least two inorganic layers and an organic layer disposed between the inorganic layers. The inorganic layers may include an inorganic material and may protect the pixel layer PXL from moisture or oxygen. The organic layer may include an organic material and may protect the pixel layer PXL from a contamination element such as dust particles.

Although not shown, a window may be disposed on the display panel DP. The window may protect the display panel DP from a scratch-causing factor or impact from the outside. The window may be attached to the display panel DP by an optically transparent adhesive material. An image produced by the display panel DP may be provided to a user through the window.

A portion of the window overlapped with the non-display area NDA may be defined as a print area and may be printed to be black. The non-display area NDA may be covered with the print area of the window. In the embodiment where the first and second cover portions COV1 and COV2 described above are omitted, the first and second non-display areas NDA1 and NDA2 may be covered with the print area of the window.

Although not shown, a touch sensing part may be further disposed between the window and the display panel DP. The touch sensing part may be configured to sense an external touch (e.g., a user's hand or a touch pen, and so forth). The display panel DP may display an image corresponding to the touch signal, in response to the touch signal sensed by the touch sensing part.

Figure 6:
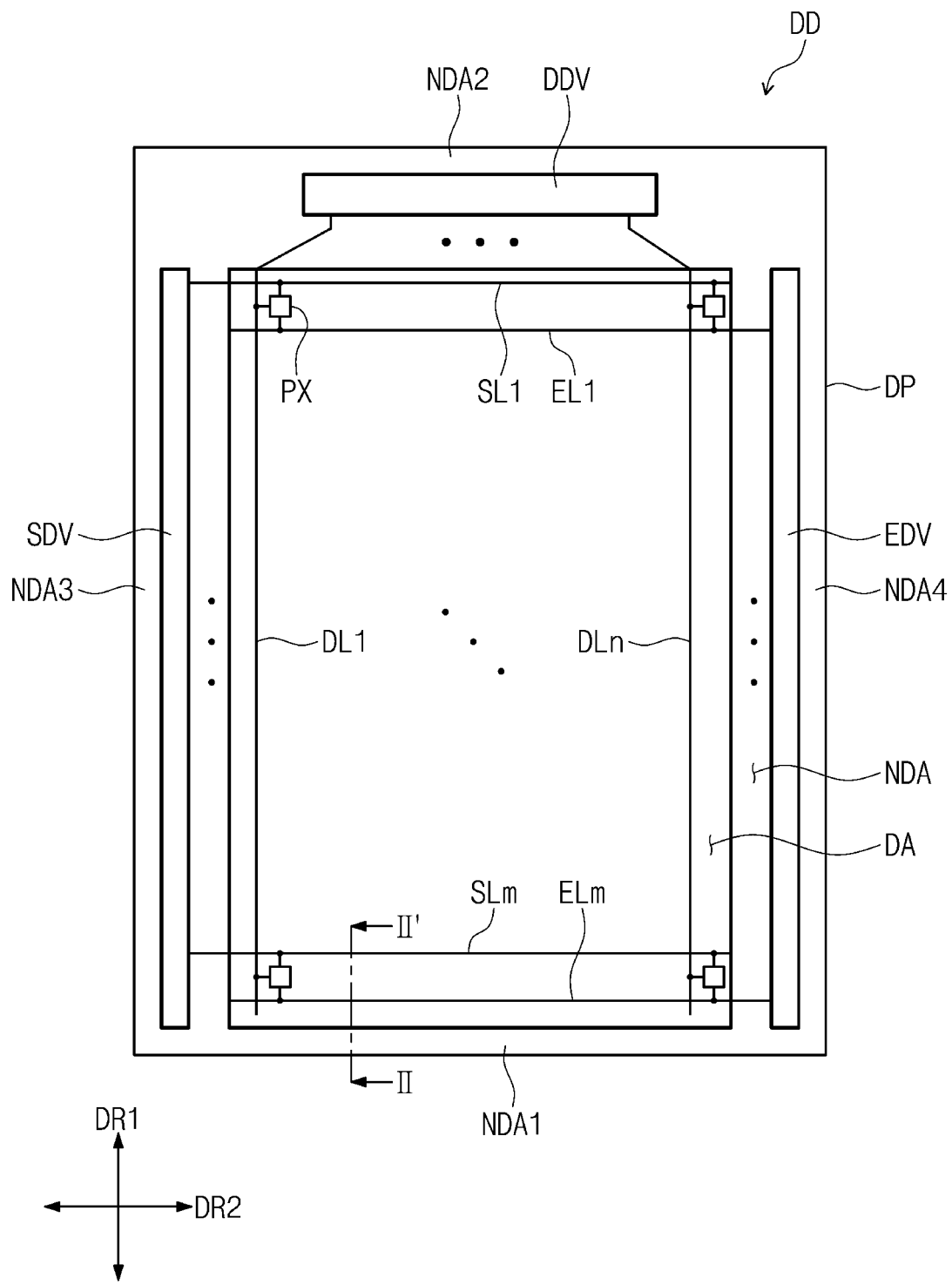
FIG. 6 is a schematic plan view of the display panel of FIG. 1 according to an exemplary embodiment of the present inventive concepts.

FIG. 6 is a schematic plan view of the display panel of FIG. 1 in accordance with an exemplary embodiment.

Referring to FIG. 6, the display device DD may include the display panel DP, a scan driver SDV, a data driver DDV, and an emission driver EDV.

The display panel DP may be a flexible display panel. For example, the display panel DP may include a plurality of electronic devices disposed on a flexible substrate. In an exemplary embodiment, the display panel DP may have a rectangular shape, whose long sides are parallel to the first direction DR1 and whose short sides are parallel to the second direction DR2.

The display panel DP may have a flat surface or plane defined by the first and second directions DR1 and DR2. The display panel DIP may include the display area DA and the non-display area NDA surrounding the display area DA. The display area DA may be defined as an area displaying an image, and the non-display area NDA may be an area that is not used for displaying an image.

The display panel DP may include a plurality of pixels PX, a plurality of scan lines SL1-SLm, a plurality of data lines DL1-DLn, and a plurality of emission lines EL1-Elm, where m and n are natural numbers.

The pixels PX may be arranged in a matrix shape. However, exemplary embodiments of the present inventive concepts are not limited to this example. The pixels PX may be disposed in the display area DA and may be connected to the scan lines SL1-SLm, the data lines DL1-DLn, and the emission lines EL1-ELm.

The scan driver SDV, the data driver DDV, and the emission driver EDV may be disposed in a portion of the non-display area NDA. The scan driver SDV may be disposed in a portion of the non-display area NDA adjacent to a side portion of the display panel DP defined as one of the long sides of the display panel DP. For example, the scan driver SDV may be disposed in the third non-display area NDA3.

The emission driver EDV may be disposed in another portion of the non-display area NDA, which is located adjacent to other side portion of the display panel DP defined to be opposite to the side portion of the display panel DP. For example, the emission driver EDV may be disposed in the fourth non-display area NDA4. The data driver DDV may be fabricated in the form of an integrated circuit chip and may be disposed in other portion of the non-display area NDA, which is located adjacent to one of the short sides of the display panel DP. For example, the data driver DDV may be disposed in the second non-display area NDA2.

The scan lines SL1-SLm may be arranged in the first direction DR1. Each scan line may extend in the second direction DR2 and may be connected to the scan driver SDV. The data lines DL1-DLn may be arranged in the second direction DR2. Each data line may extend in the first direction DR1 and may be connected to the data driver DDV. The emission lines EL1-Elm may be arranged in the first direction DR1. Each emission line may extend in the second direction DR2 and may be connected to the emission driver EDV.

The scan driver SDV may produce a plurality of scan signals, and the scan signals may be applied to the pixels PX through the scan lines SL1-SLm. The scan signals may be sequentially applied to the pixels PX.

The data driver DDV may produce a plurality of data voltages, and the data voltages may be applied to the pixels PX through the data lines DL1-DLn. The emission driver EDV may produce a plurality of emission signals, and the emission signals may be applied to the pixels PX through the emission lines EL1-ELm.

The display panel DP may include a timing controller for controlling operations of the scan driver SDV, the data driver DDV, and the emission driver EDV.

The timing controller may be configured to generate scan control signals, data control signals, and emission control signals in response to control signals to be transmitted from the outside. The timing controller may receive image signals from the outside, may convert the image signals to a data format, which is suitable for interface specifications required by the data driver DDV, and may provide the converted data to the data driver DDV.

The scan driver SDV may produce scan signals in response to the scan control signal, and the emission driver EDV may produce emission signals in response to the emission control signal. The data driver DDV may receive the image signals of the converted data format and may then generate data voltages corresponding to the image signals, in response to the data control signal.

The pixels PX may receive the data voltages in response to the scan signals. The pixels PX may emit light, which has a brightness level corresponding to the data voltage and forms an image, in response to the emission signals. A light-emitting time of the pixel PX may be controlled by the emission signals.

Figure 7:
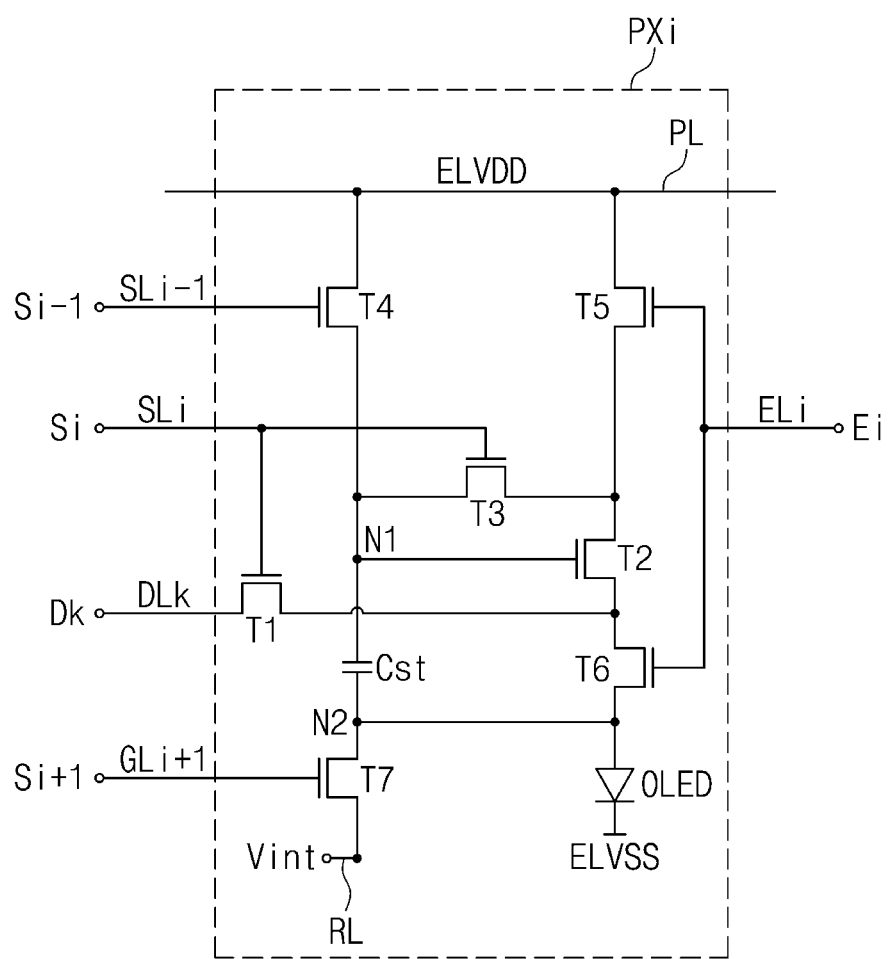
FIG. 7 is an equivalent circuit diagram of one of the pixels of FIG. 6 according to an exemplary embodiment of the present inventive concepts.

FIG. 7 is an equivalent circuit diagram of one of the pixels of FIG. 6.

Although an example of an equivalent circuit diagram of one pixel PXi is illustrated in FIG. 7, the others of the pixels PX shown in FIG. 6 may have the same circuit structure as that of the pixel PXi shown in FIG. 7.

Referring to FIG. 7, the pixel PXi may be connected to a corresponding one (e.g., SLi) of the scan lines SL1-SLm, a corresponding one (e.g., DLk) of the data lines DL1-DLn, and a corresponding one (e.g., ELi) of the emission lines EL1-Elm, where i is a natural number less than or equal to m, and k is a natural number less than or equal to n.

The pixel PXi may include a light-emitting element OLED, a driving transistor T1, a capacitor Cst, a switching transistor T2, and an emission control transistor T3. The light-emitting element OLED may be defined as an organic light emitting diode.

A source terminal of the driving transistor T1 may be applied with a first voltage ELVDD, and a drain terminal of the driving transistor T1 may be connected to a source terminal of the emission control transistor T3. A gate terminal of the driving transistor T1 may be connected to a drain terminal of the switching transistor T2.

A gate terminal of the switching transistor T2 may be connected to the scan line SLi, and a source terminal of the switching transistor T2 may be connected to the data line DLj. A first electrode of the capacitor Cst may be connected to the source terminal of the driving transistor T1, and a second electrode of the capacitor Cst may be connected to the gate terminal of the driving transistor T.

A gate terminal of the emission control transistor T3 may be connected to the emission line ELi, and a drain terminal of the emission control transistor T3 may be connected to an anode electrode of the light-emitting element OLED. A cathode electrode of the light-emitting element OLED may be applied with a second voltage ELVSS, which is lower than the first voltage ELVDD.

The switching transistor T2 may be turned on in response to a scan signal provided through the scan line SLi. If the switching transistor T2 is turned on, a data voltage applied through the data line DLk may be provided to the gate terminal of the driving transistor T1.

The capacitor Cst may be charged to the data voltage applied to the gate terminal of the driving transistor T1 and may be used to maintain the data voltage, even after the switching transistor T2 is turned off.

The emission control transistor T3 may be turned on in response to an emission signal provided through the emission line ELi. In this embodiment, the emission control transistor T3 may supply a current from the driving transistor T11 to the light-emitting element OLED. The pixel PX may be configured to emit light during an applying period of the light-emitting signal EM. An intensity of light emitted from the light-emitting element OLED may be changed depending on an amount of the current.

In an exemplary embodiment, the transistors T1-T3 of the pixel PX may be PMOS transistors. However, exemplary embodiments of the present inventive concepts are not limited to this example. For example, the transistors T1-T3 of the pixel PX may be NMOS transistors.

Figure 8:
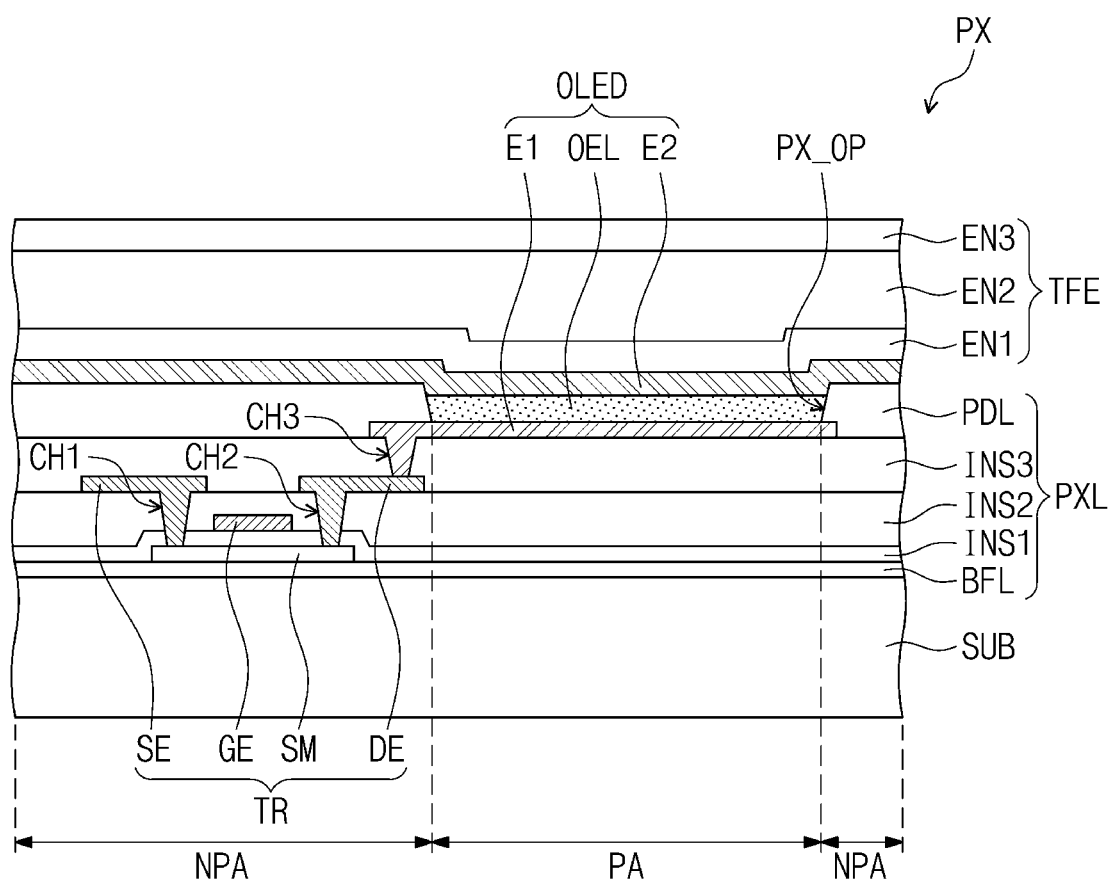
FIG. 8 is a sectional view schematically illustrating a structure of the pixel of FIG. 7 according to an exemplary embodiment of the present inventive concepts.

FIG. 8 is a sectional view illustrating a portion corresponding to the light-emitting element of FIG. 7.

Referring to FIG. 8, the pixel PX may include the light-emitting element OLED and a transistor TR connected to the light-emitting element OLED. The light-emitting element OLED may include a first electrode E1, a second electrode E2, and an organic light emitting layer OEL disposed between the first electrode E1 and the second electrode E2. The transistor TR may be the emission control transistor T3 shown in FIG. 7. The first electrode E1 may be an anode, and the second electrode E2 may be a cathode electrode.

The pixel PX may be divided into a pixel area PA and a non-pixel area NPA around the pixel area PA. The light-emitting element OLED may be disposed in the pixel area PA, and the transistor TR may be disposed in the non-pixel area NPA. The transistor TR and the light-emitting element OLED may be disposed on the substrate SUB. A buffer layer BFL may be disposed on the substrate SUB, and the buffer layer BFL may include an inorganic material.

A semiconductor layer SM of the transistor TR may be disposed on the buffer layer BFL. The semiconductor layer SM may be formed of or include an inorganic semiconductor material (e.g., amorphous silicon or poly silicon) or an organic semiconductor material. In addition, the semiconductor layer SM may include at least one of semiconductor oxides. The semiconductor layer SM may include a source area, a drain area, and a channel area between the source area and the drain area.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 to be overlapped with the semiconductor layer SM. The gate electrode GE may be overlapped with the channel area of the semiconductor layer SM.

A second insulating layer INS2 may be disposed on the first insulating layer INS1 to cover the gate electrode GE. The second insulating layer INS2 may be defined as an inter-layered insulating layer. The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source area of the semiconductor layer SM through a first contact hole CH1, which is defined to penetrate the first insulating layer INS1 and the second insulating layer INS2. The drain electrode DE may be connected to the drain area of the semiconductor layer SM through a second contact hole CH2, which is defined to penetrate the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be defined as a planarization layer providing a flat top surface and may include an organic material.

The first electrode E1 may be disposed on the third insulating layer INS3. The first electrode E1 may be connected to the drain electrode DE of the transistor TR through a third contact hole CH3, which is defined to penetrate the third insulating layer INS3. The first electrode E1 may be defined as a pixel electrode. The first electrode E1 may include a transparent electrode or a reflective electrode.

A pixel definition layer PDL may be disposed on the first electrode E1 and the third insulating layer INS3 to expose a specific portion of the first electrode E1. An opening PX_OP, which exposes the specific portion of the first electrode E1, may be defined in the pixel definition layer PDL.

The organic light emitting layer OEL may be disposed in the opening PX_OP and on the first electrode E1. The organic light emitting layer OEL may produce one of red, green, and blue lights. However, exemplary embodiments of the present inventive concepts are not limited to this example, and the organic light emitting layer OEL may include a mixture of organic materials capable of generating red, green, and blue lights and may be configured to generate white light.

The second electrode E2 may be disposed on the pixel definition layer PDL and the organic light emitting layer OEL. The second electrode E2 may be defined as a common electrode. The second electrode E2 may include a transparent electrode or a reflective electrode.

In an embodiment where the display panel DP is a top emission type organic light emitting display panel, the first electrode E1 may be formed of a reflective electrode, and the second electrode E2 may be formed of a transparent electrode. In an embodiment where the display panel DP is a bottom emission type organic light emitting display panel, the first electrode E1 may be formed of a transparent electrode and the second electrode E2 may be formed of a reflective electrode. The first electrode E1 may be a hole injection electrode or a positive electrode, and the second electrode E2 may be an electron injection electrode or a negative electrode.

The thin encapsulation layer TFE may be disposed on the light-emitting element OLED to cover the pixel PX. The thin encapsulation layer TFE may include a first encapsulation layer EN1 disposed on the light-emitting element OLED, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic material, and the second encapsulation layer EN2 may include an organic material. A thickness of the second encapsulation layer EN2 may be larger than a thickness of each of the first and third encapsulation layers EN1 and EN3. Layers between the substrate SUB and the thin encapsulation layer TFE may be defined as the pixel layer PXL including the pixel PX.

The first voltage ELVDD may be applied to the first electrode E1, and the second voltage ELVSS may be applied to the second electrode E2. In an embodiment where holes and electrons are injected into the organic light emitting layer OEL, excitons may be produced. Light may be emitted from the light-emitting element OLED, when the excitons are transitioned to a ground state. The light emitting element OLED may emit red, green, or blue light, which constitutes an image to be seen by a user, by using a current flowing therethrough.

Figure 9:
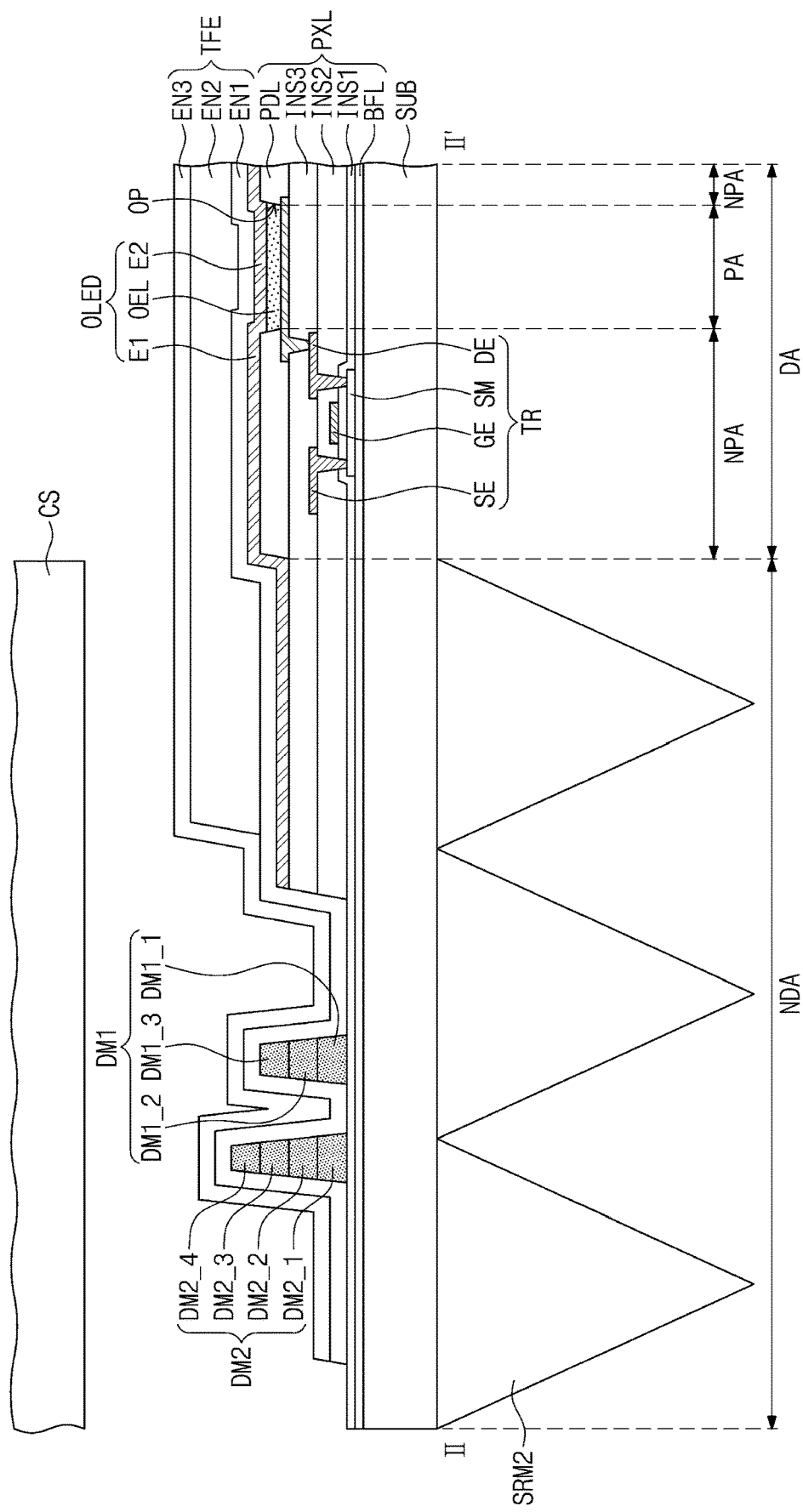
FIG. 9 is a sectional view taken along line II-II' of FIG. 6 according to an exemplary embodiment of the present inventive concepts.

FIG. 9 is a sectional view taken along line II-II' of FIG. 6.

Referring to FIG. 9, the substrate SUB may include the display area DA and the non-display area NDA. The display area DA of the substrate SUB may include the pixel area PA and the non-pixel area NPA.

The buffer layer BFL and the first insulating layer INS1 may be disposed on the display area DA and the non-display area NDA. The second insulating layer INS2 may be disposed on the display area DA and may be extended to a specific portion of the non-display area NDA.

The third insulating layer INS3 on the display area DA may be extended to a specific portion of the non-display area NDA and may be disposed on the second insulating layer INS2. On the display area DA, the third insulating layer INS3 may be disposed on the transistor TR to cover the transistor.

The light-emitting element OLED may be disposed on the third insulating layer INS3. The second electrode E2 of the light-emitting element OLED may be extended to a specific portion of the non-display area NDA and may be disposed on the third insulating layer INS3 on the non-display area NDA.

On the non-display area NDA, first and second dam members DM1 and DM2 may be disposed on the substrate SUB. The first and second dam members DM1 and DM2 may be spaced apart from the second and third insulating layers INS2 and INS3 on the non-display area NDA and may be extended along an edge of the substrate SUB. The second dam member DM2 may extend higher than the first dam member DM1. The second dam member DM2 may be disposed adjacent to the edge of the substrate SUB, and the first dam member DM1 may be adjacent to the second and third insulating layers INS2 and INS3.

The first dam member DM1 may include a first dam insulating layer DM1_1 disposed on the substrate SUB, a second dam insulating layer DM1_2 disposed on the first dam insulating layer DM1_1, and a third dam insulating layer DM1_3 disposed on the second dam insulating layer DM1_2. The second dam member DM2 may include a fourth dam insulating layer DM2_1 disposed on the substrate SUB, a fifth dam insulating layer DM2_2 disposed on the fourth dam insulating layer DM2_1, a sixth dam insulating layer DM2_3 disposed on the fifth dam insulating layer DM2_2, and a seventh dam insulating layer DM2_4 disposed on the sixth dam insulating layer DM2_3.

The first to seventh dam insulating layers DM1_1-DM2_4 may include an organic material. The first to sixth dam insulating layers DM1_1-DM2_3 may be formed of the same material as the second insulating layer INS2, the third insulating layer INS3, or the pixel definition layer PDL, and the seventh dam insulating layer DM2_4 may be formed of an organic material different from them. However, exemplary embodiments of the present inventive concepts are not limited to this example, and in an embodiment, the seventh dam insulating layer DM2_4 may be formed of the same material as the second insulating layer INS2, the third insulating layer INS3, or the pixel definition layer PDL.

The first encapsulation layer EN1 may be disposed on the substrate SUB to cover the light-emitting element OLED of the display area DA, the third insulating layer INS3 of the non-display area NDA, the first insulating layer INS of the non-display area NDA, and the first and second dam members DM1 and DM2. The second encapsulation layer EN2 may be disposed on the first encapsulation layer EN1 of the display area DA and may be extended to the non-display area NDA.

The second encapsulation layer EN2 may be spaced apart from an edge of the third insulating layer INS3 and may be disposed on a portion of the first encapsulation layer EN1 overlapped with the third insulating layer INS3. The third encapsulation layer EN3 may be disposed on the first encapsulation layer EN and covers the second encapsulation layer EN2.

During a process of forming the thin encapsulation layer TFE, an organic material for forming the second encapsulation layer EN2 may be provided on the first encapsulation layer EN1. In the case where the organic material for forming the second encapsulation layer EN2 is excessively provided, the organic material may be overflown out of the substrate SUB. The organic material provided in excess may be contained in a gap defined between the first dam member DM1 and the second and third insulating layers INS2 and INS3 and a gap defined between the second dam member DM2 and the first dam member DM1.

The non-display area NDA shown in FIG. 9 may be the second non-display area NDA2 shown in FIG. 2. Thus, the second stress-relieving members SRM2 may be disposed on the rear surface of the non-display area NDA.

Figure 11:
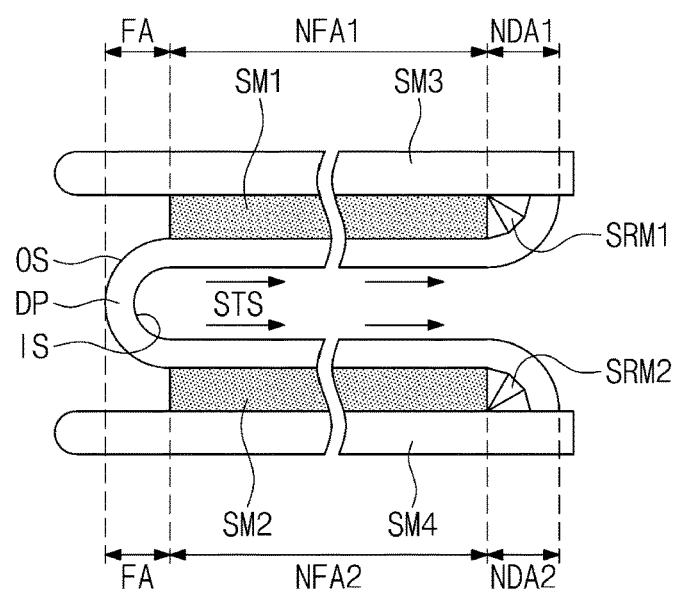
FIG. 11 is a diagram illustrating a folded structure of the display panel of FIG. 10 according to an exemplary embodiment of the present inventive concepts.
Figure 12:
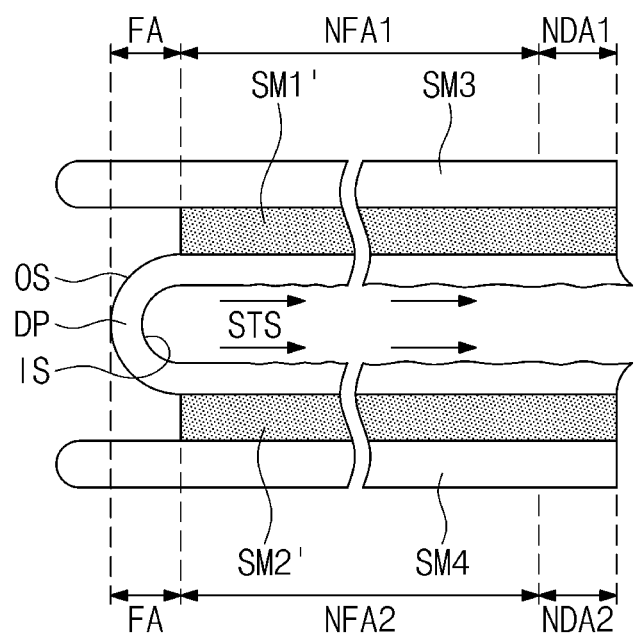
FIG. 12 is a diagram for describing some of technical advantages, which are achieved by a stress-relieving member according to an exemplary embodiment of the present inventive concepts.
Figure 12:
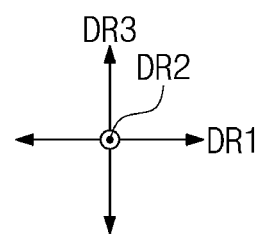

FIG. 10 is an enlarged sectional view illustrating a display panel, first to fourth supporting members, and first and second stress-relieving members. FIG. 11 is a diagram illustrating a folded structure of the display panel of FIG. 10. FIG. 12 is a diagram for comparatively describing some of technical advantages, which are achieved by a stress-relieving member according to an embodiment of the inventive concept.

For convenience in description and illustration, portions of the display panel DP, the first to fourth supporting members SM1-SM4, and the first and second stress-relieving members SRM1 and SRM2 are omitted from FIGS. 10 and 11.

Referring to the exemplary embodiment shown in FIG. 10, when viewed in the second direction DR2, each of the first and second stress-relieving members SRM1 and SRM2 may have an inverted triangular section. A length of each of the second and third sides S2 and S3 may be longer than a length of each of the first sides S1. The first sides S1 may be attached to the rear surfaces of the first and second non-display areas NDA1 and NDA2.

Referring to FIG. 11, when the display panel DP is folded, the folding area FA may be bent to have a curved surface. When the display panel DP is folded, stress on the display panel caused by the folding may move side surfaces of the first stress-relieving members SRM1 facing each other in the first direction DR1 to contact each other or move towards each other. The stress on the display panel caused by the folding may also move side surfaces of the second stress-relieving members SRM2 facing each other in the first direction DR1 to contact each other or move towards each other. For example, the side surfaces of the first and second stress-relieving members SRM1 and SRM2 may be the second and third sides S2 and S3.

When the display panel DP is folded, the first and second non-display areas NDA1 and NDA2 may be bent as the side surfaces of the first stress-relieving member SRM1 and the side surfaces of the second stress-relieving member SRM2 contact each other or move towards each other. A bending direction of each of the first and second non-display areas NDA1 and NDA2 may be opposite to a bending direction of the folding area FA.

Side surfaces of the first stress-relieving members SRM1 may be in contact with each other, and the first non-display area NDA may be bent toward a space defined by the first supporting member SM1 and the third supporting member SM3 (e.g., within first area A1). For example, the first non-display area NDA1 may be bent in such a way that an end portion of the first non-display area NDA1 is directed towards, or in contact with, the third supporting member SM3. The first non-display area NDA1 may be bent such that the front surface of the first non-display area NDA1 has a convex shape. The space defined by the first supporting member SM1 and the third supporting member SM3 may provide a space, allowing for the bending of the first non-display area NDA1.

Side surfaces of the second stress-relieving members SRM2 may be in contact with each other, and the second non-display area NDA2 may be bent toward a space defined by the second supporting member SM2 and the fourth supporting member SM4 (e.g., within second area A2). For example, the second non-display area NDA2 may be bent in such a way that an end portion of the second non-display area NDA2 is directed towards the fourth supporting member SM4. The second non-display area NDA2 may be bent such that a front surface of the second non-display area NDA2 has a convex shape. The space defined by the second supporting member SM2 and the fourth supporting member SM4 (e.g., second area A2) may provide a space, allowing for the bending of the second non-display area NDA2.

A convex surface of the folding area FA in the folded state may be defined as an outer surface OS of the folding area FA, and a concave surface of the folding area FA in the folded state may be defined as an inner surface IS of the folding area FA. When the folding area FA is in a flat state, the outer surface OS of the folding area FA may be defined as a rear surface of the folding area FA, and the inner surface IS of the folding area FA may be defined as a front surface of the folding area FA.

When the folding area FA is in a flat state, the rear surface of the folding area FA and the front surface of the folding area FA may have the same area. However, if the display panel DP is folded, the folding area FA may be deformed to have a curved shape, and thus, the inner surface IS of the folding area FA may have an area smaller than that of the outer surface OS of the folding area FA. Thus, when the display panel DP is folded, a stress STS may occur such that the front surface of the display panel DP is pushed to the outside along the surface of the display panel DP.

If, as shown in FIG. 12, end portions of the display panel DP are attached to comparative supporting members SM1' and SM2', it is hard to disperse the stress STS to the outside, and thus, the shape of the display panel DP may be deformed by the stress STS. For example, the surface of the display panel DP in the display area DA may be deformed to have an uneven or rugged shape.

By contrast, according to an exemplary embodiment of the present inventive concepts, the first and second non-display areas NDA1 and NDA2 may define end portions (e.g., edges) of the display panel DP and the first and second supporting members SM1 and SM2 may not extend to the end portions of the display panel DP. The end portions of the display panel DP in the first and second non-display areas NDA1 and NDA2 may be bent toward the space defined by the first and third supporting members SM1 and SM3 and toward the space defined by the second and fourth supporting members SM2 and SM4 as the side surfaces of the first and second stress-relieving members SRM1 and SRM2 contact each other. Thus, it may be possible to reduce the stress STS and prevent deformation of the display panel.

As a result, the display device DD according to an exemplary embodiment of the present inventive concepts may relieve the stress STS, which may occur when the display panel DP is folded, and may prevent the display panel DP from being deformed, such as in the display area DA.

FIGS. 13 to 19 are diagrams illustrating some examples of a stress-relieving member according to exemplary embodiments of the present inventive concepts.

In the following description of stress-relieving members SRM1_1-SRM1_3, SRM2_1-SRM2_3, and SRM' shown in FIGS. 13 to 19, features different from the stress-relieving members SRM1 and SRM2 of FIGS. 2 to 4 will be mainly described. The display panel DP and the first to fourth supporting members SM1-SM4, which are peripheral elements of the stress-relieving members SRM1_1-SRM1_3, SRM2_1-SRM2_3, and SRM', may be substantially the same as those of FIGS. 2 to 4, and they will be identified by a similar or identical reference number without repeating an overlapping description thereof.

Figure 13:
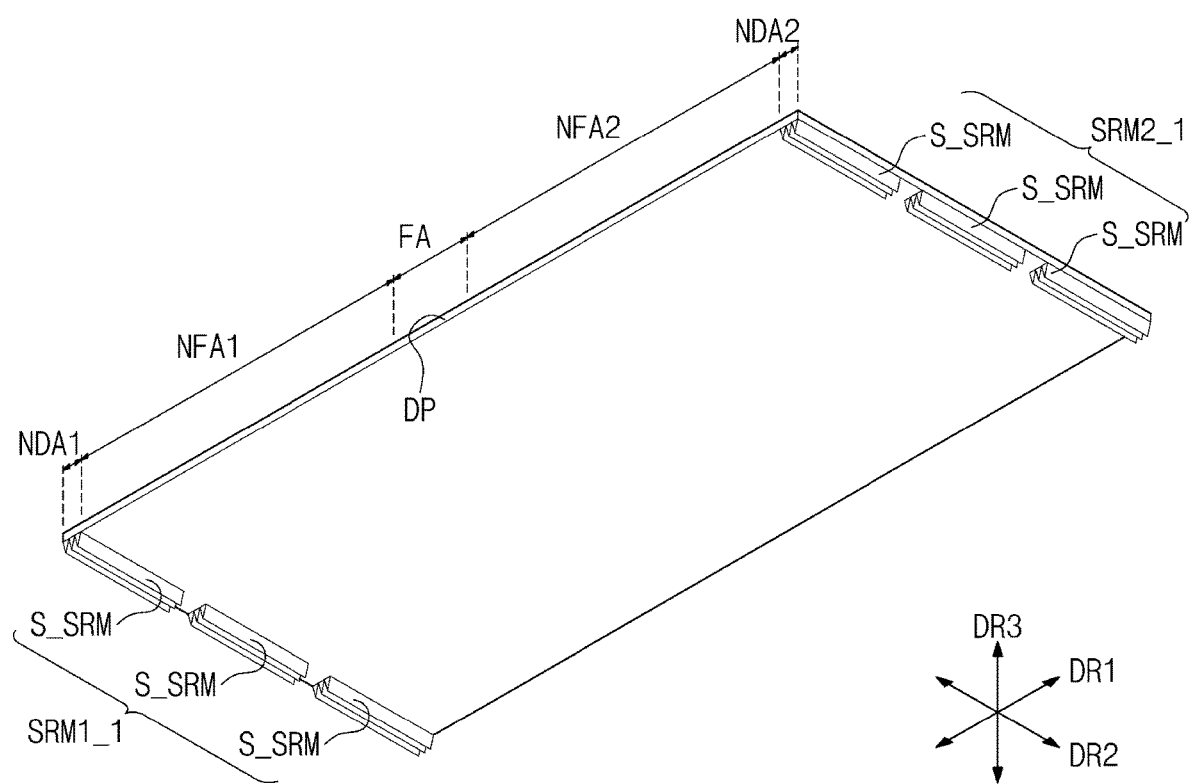
FIGS. 13 to 19 are diagrams illustrating some examples of a stress-relieving member according to an exemplary embodiment of the present inventive concepts.

Referring to FIG. 13, each of the stress-relieving members SRM1_1 and SRM2_1 may include a plurality of sub-stress-relieving members S_SRM. As an example, each of the stress-relieving members SRM1_1 and SRM2_1 is illustrated to include three sub-stress-relieving members S_SRM, but the number of the sub-stress-relieving members S_SRM is not limited to this example.

The sub-stress-relieving members S_SRM may be extended in the second direction DR2 and may be spaced apart from each other in the second direction DR2. The sub-stress-relieving members S_SRM may have an inverted triangular shape and may be disposed on the rear surfaces of the first and second non-display areas NDA1 and NDA2.

Like the stress-relieving members SRM1 and SRM2 shown in FIGS. 2 to 4, the first and second non-display areas NDA1 and NDA2 may be bent as the sub-stress-relieving members S_SRM contact each other, when the display panel DP is folded.

Figure 14:
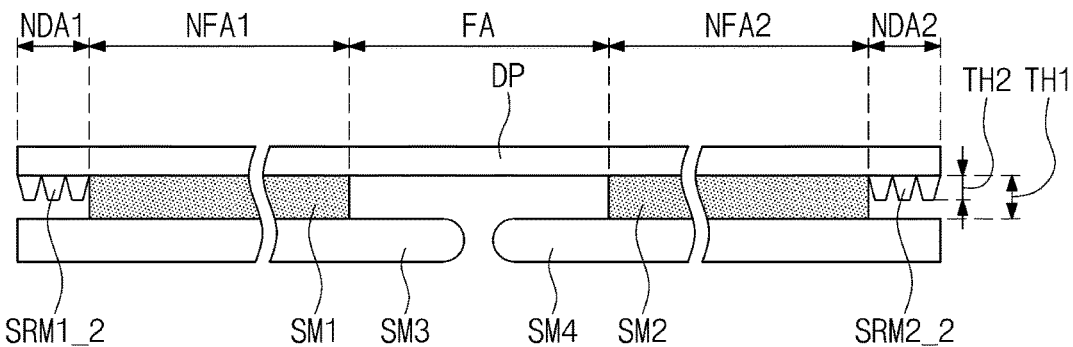
Figure 15:
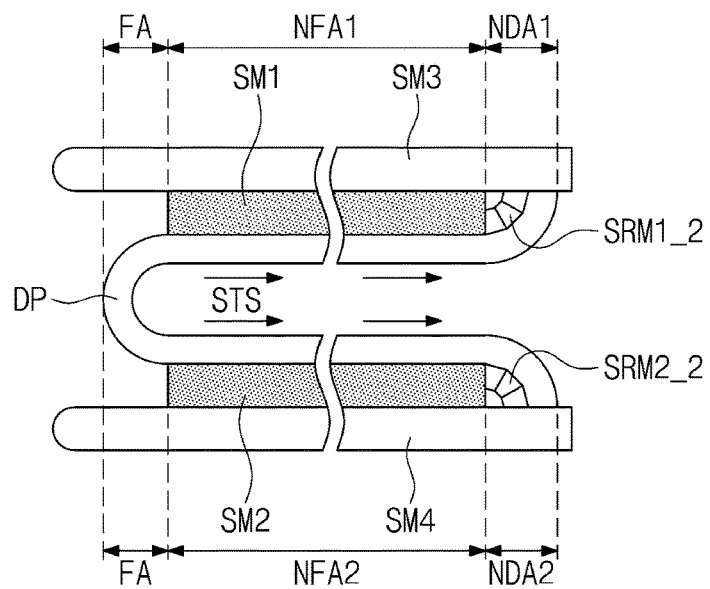

Referring to the exemplary embodiments shown in FIGS. 14 and 15, each of the stress-relieving members SRM1_2 and SRM2_2 may have an inverted trapezoidal shape and may be disposed on the rear surfaces of the first and second non-display areas NDA1 and NDA2. A width of each of the stress-relieving members SRM1_2 and SRM2_2 may decrease with increasing distance from the rear surface of the display panel DP. When measured in the third direction DR3, each of the first and second supporting members SM1 and SM2 may have a first thickness TH1, and each of the stress-relieving members SRM1_2 and SRM2_2 may have a second thickness TH2 smaller than the first thickness TH1.

When the display panel DP is folded, the first and second non-display areas NDA1 and NDA2 may be bent as the side surfaces of the stress-relieving members SRM1_2 contact each other and the side surfaces of the stress-relieving members SRM2_2 contact each other. In an exemplary embodiment, the stress-relieving members SRM1_2 and SRM2.2 may be substantially different from the stress-relieving members SRM1 and SRM2 of FIGS. 2 to 4 in terms of their shape, and the stress-relieving members SRM1_2 and SRM2_2 may permit the bending of the first and second non-display areas NDA1 and NDA2, like the stress-relieving members SRM1 and SRM2.

Figure 16:
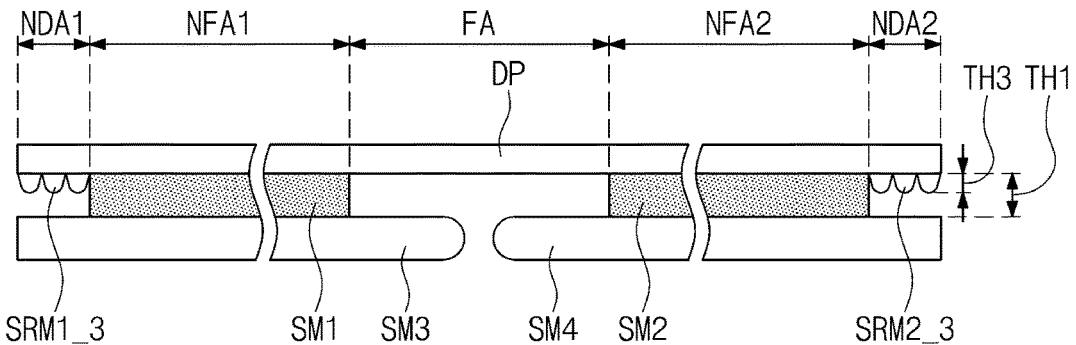
Figure 17:
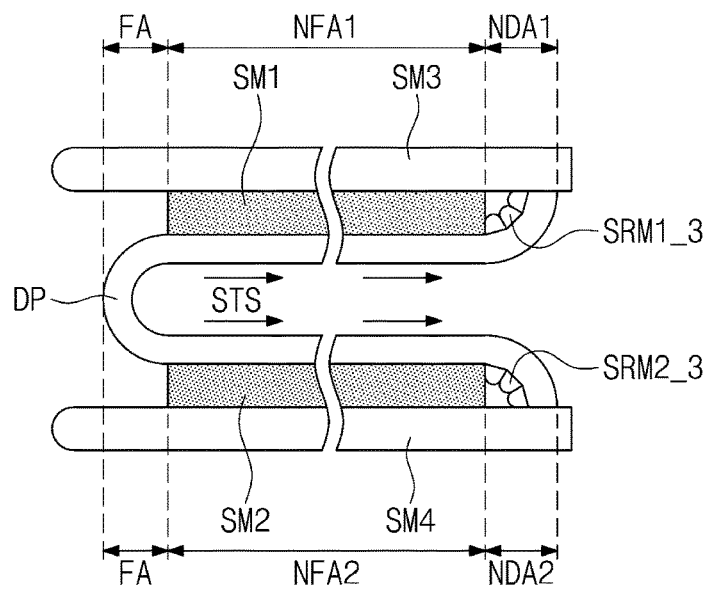
Figure 17:
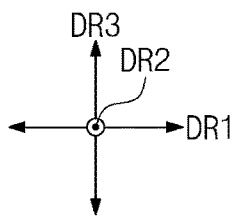

Referring to FIGS. 16 and 17, each of the stress-relieving members SRM1_3 and SRM2_3 may have a curved shape downwardly protruding from the rear surfaces of the first and second non-display areas NDA1 and NDA2 and may be disposed on the rear surfaces of the first and second non-display areas NDA1 and NDA2.

A width of each of the stress-relieving members SRM1_3 and SRM2_3 may decrease as the distance from the rear surface of the display panel DP increases. When measured in the third direction DR3, each of the first and second supporting members SM1 and SM2 may have the first thickness TH1, and each of the stress-relieving members SRM1_3 and SRM2_3 may have a third thickness TH3 smaller than the first thickness TH1.

When the display panel DP is folded, the first and second non-display areas NDA1 and NDA2 may be bent by the stress-relieving members SRM1_3 and SRM2_3 in contact with each other. In an exemplary embodiment, the stress-relieving members SRM1_3 and SRM2_3 may be substantially different from the stress-relieving members SRM1 and SRM2 of FIGS. 2 to 4 in terms of their shape, and the stress-relieving members SRM1_3 and SRM2_3 may permit the bending of the first and second non-display areas NDA1 and NDA2, like the stress-relieving members SRM1 and SRM2.

Figure 18:
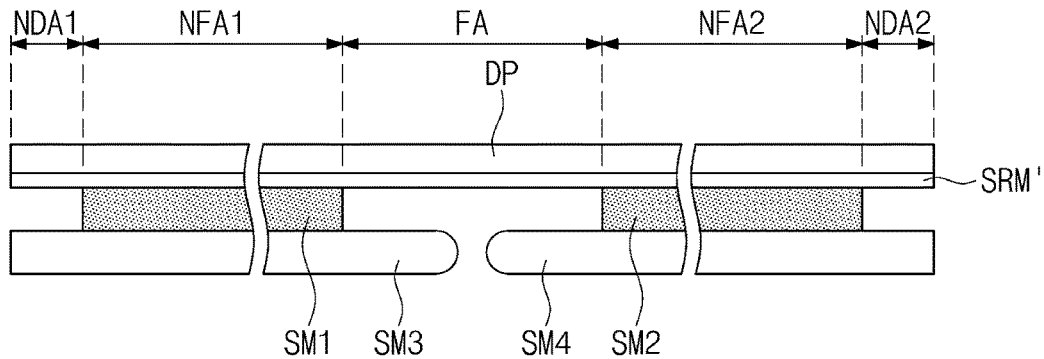
Figure 18:
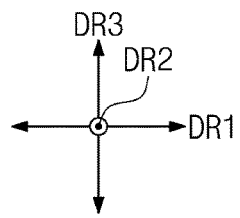
Figure 19:
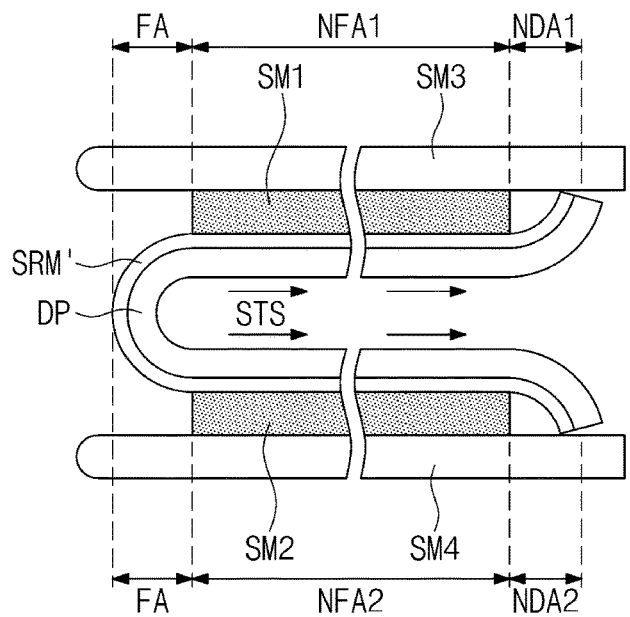
Figure 19:
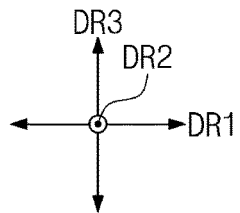

Referring to FIGS. 18 and 19, the stress-relieving member SRM' may be disposed on the rear surface of the display panel DP. For example, the stress-relieving member SRM' may be substantially planar and disposed directly on the rear surface of the display panel DP. The first and second supporting members SM1 and SM2 may overlap the first and second non-folding areas NFA1 and NFA2, respectively, and may be disposed on a rear surface of the stress-relieving member SRM'.

The first supporting member SM1 may be disposed on a bottom surface of the stress-relieving member SRM' overlapped with the first non-folding area NFA1. The second supporting member SM2 may be disposed on a bottom surface of the stress-relieving member SRM' overlapped with the second non-folding area NFA2. The third supporting member SM3 may be disposed on the rear surface of the first supporting member SM1 and below the first non-display area NDA1. The fourth supporting member SM4 may be disposed on the rear surface of the second supporting member SM2 and below the second non-display area NDA2.

An elastic strength of the stress-relieving member SRM' may be greater than an elastic strength of the display panel DP. When the display panel DP is folded, a stress produced in the display panel DP may be greater than an elastic strength of the stress-relieving member SRM'.

Since the stress produced in the display panel DP is greater than the elastic strength of the stress-relieving member SRM', the first non-display area NDA1 may be bent in such a way that the end portion of the first non-display area NDA1 is directed to the third supporting member SM3, when the folding area FA is folded. In addition, when the folding area FA is folded, the second non-display area NDA2 may be bent in such a way that an end portion of the second non-display area NDA2 is directed to the fourth supporting member SM4. Thus, the stress may be relieved, and the display panel DP may be prevented from being deformed.

When the folded display panel DP is unfolded to have the flat shape shown in FIG. 18, the display panel DP may be unfolded or flattened by the stress-relieving member SRM', because the elastic strength of the stress-relieving member SRM' is greater than the elastic strength of the display panel DP.

According to an exemplary embodiment of the present inventive concepts, a display device may include at least one stress-relieving member, which may be disposed below two opposite edges of a display panel. The at least one stress-relieving member may relieve a stress, which may occur when the display panel is folded, and this may make it possible to prevent the display panel from being deformed.

While exemplary embodiments of the present inventive concepts have been particularly shown and described, it will be understood by one of ordinary skill in the art that variations in form and detail may be made therein without departing from the spirit and scope of the attached claims.

What is claimed is:

1. A display device, comprising:
a display panel including a folding area, a first non-display area, a second non-display area, a first non-folding area disposed between the first non-display area and the folding area, and a second non-folding area disposed between the second non-display area and the folding area, the folding area, the first and second non-display areas, and the first and second non-folding areas are arranged in a first direction, wherein the display device is not configured to display an image in the first non-display area and the second non-display area;
a plurality of stress-relieving members disposed on rear surfaces of the first and second non-display areas, the plurality of stress-relieving members extending in a second direction crossing the first direction, and arranged in the first direction;
a first supporting member disposed on a rear surface of the first non-folding area; and
a second supporting member disposed on a rear surface of the second non-folding area,
wherein, in response to a folding of the display panel along a folding axis overlapped with the folding area and extended in the second direction, the first and second non-display areas are bent by surfaces of each of the stress-relieving members contacting each other, and a bending direction of each of the first and second non-display areas is opposite to a bending direction of the folding area.

2. The display device of claim 1., wherein a width of each of the stress-relieving members decreases as a distance from the rear surfaces of the first and second non-display areas increases in a third direction crossing a plane defined by the first and second directions.

3. The display device of claim 2, wherein side surfaces of the stress-relieving members facing each other in the first direction are configured to contact with each other when the display panel is folded.

4. The display device of claim 1, wherein the stress-relieving members comprise:
a plurality of first stress-relieving, members attached to the rear surface of the first non-display area and disposed in a first area. adjacent to an end of the first supporting member; and
a plurality of second stress-relieving members attached to the rear surface of the second non-display area and disposed in a second area adjacent to an end of the second supporting member.

5. The display device of claim 4, wherein a length of the first area measured in the first direction is substantially equal to a length of the second area measured in the first direction.

6. The display device of claim 5, wherein, a ratio of the length of the first area measured in the first direction to an entire length of the display panel is about 1:50.

7. The display device of claim 5, wherein:

the length of the first area measured in the first direction is substantially equal to a sum of a thickness of the first supporting member and a thickness of the display panel; and
the length of the second area measured in the first direction is substantially equal to a sum of a thickness of the second supporting member and a thickness of the display panel.

8. The display device of claim 4, further comprising:
a third supporting member disposed below the first stress-relieving members and attached to a rear surface of the first supporting member; and
a fourth supporting member disposed below the second stress-relieving members and attached to a rear surface of the second supporting member.

9. The display device of claim 8, wherein, when the display panel is folded, side surfaces of the first stress-relieving members contact each other and the first non-display area is bent to move an end portion of the first non-display area towards the third supporting member.

10. The display device of claim 9, wherein a front surface of the first non-display area has a convex shape when the first non-display area is bent.

11. The display device of claim 8, wherein, when the display panel is folded, side surfaces of the second stress-relieving members contact each other and the second non-display area is bent to move an end portion of the second non-display area towards the fourth supporting member.

12. The display device of claim 11, wherein a front surface of the second non-display area has a convex shape when the second non-display area is bent.

13. The display device of claim 8, further comprising:
a case member housing the display panel, the first and second supporting members, the first and second stress-relieving members, and the third and fourth supporting members; and
a hinge member connected to the case member and configured to provide the folding axis.

14. The display device of claim 13, wherein the case member covers the first and second non-display areas.

15. The display device of claim 1, wherein each of the stress-relieving members has an inverted triangular shape, when viewed in the second direction.

16. The display device of claim 15, wherein each of the stress-relieving members comprises a first side, a second side, and a third side that are connected to form a triangular shape when viewed in the second direction,
the first sides of the stress-relieving members are attached to the rear surfaces of the first and second non-display areas, and
a length of each of the second and third sides is longer than a length of the first side.

17. The display device of claim 1, wherein each of the stress-relieving members has an inverted trapezoidal shape when viewed in the second direction.

18. The display device of claim 1, wherein the stress-relieving members have a curved shape downwardly protruding from the rear surfaces of the first and second non-display areas when viewed in the second direction.

19. The display device of claim 1, wherein each of the stress-relieving members comprises a plurality of sub-stress-relieving members that are arranged to be spaced apart from each other in the second direction.

20. A display device, comprising:
a display panel including a folding area, a first non-display area, a second non-display area, a first non-folding area disposed between the first non-display area and the folding area, and a second non-folding area disposed between the second non-display area and the folding area, the folding area, the first and second non-display areas, and the first and second non-folding areas are arranged in a first direction, wherein the display device is not configured to display an image in the first non-display area and the second non-display area;

a plurality of stress-relieving members attached to rear surfaces of the first and second non-display areas, the plurality of stress-relieving members extending in a second direction crossing the first direction, and arranged in the first direction, the plurality of stress-relieving members are configured to deform due to stress on the display panel in response to a folding of the display panel;

a first supporting member disposed on a rear surface of the first non-folding area;

a second supporting member disposed on a rear surface of the second non-folding area; and a hinge member overlapped with the folding area to provide a folding axis, which extends in the second direction, to the display panel.

21. The display device of claim 20, wherein, a width of each of the stress-relieving members decreases with increasing distance from the rear surface of the non-display area, and when the display panel is folded along the folding axis, side surfaces of the stress-relieving members facing each other in the first direction are in contact with each other.

22. The display device of claim 21, wherein, when the display panel is folded, the first and second non-display areas are bent by surfaces of each of the stress-relieving members contacting each other, and a bending direction of each of the first and second non-display areas is opposite to a bending direction of the folding area.

23. The display device of claim 21, further comprising:

a third supporting member disposed on a rear surface of the first supporting member and below the first non-display area; and a fourth supporting member disposed on a rear surface of the second supporting member and below the second non-display area, wherein the stress-relieving members are disposed between the first non-display area and the third supporting member and between the second non-display area and the fourth supporting member, when the display panel is folded, the first non-display area is bent toward a space defined by the first supporting member and the third supporting member, and the second non-display area is bent toward a space defined by the second supporting member and the fourth supporting member.

24. A display device, comprising:

a display panel including a folding area, a first non-display area, a second non-display area, a first ton-folding area disposed between the first non-display area and the folding area, and a second non-folding area disposed between the second non-display area and the folding area, the folding area, the first and second non-display areas, and the first and second non-folding areas are arranged in a first direction, wherein the display device is not configured to display an image in the first non-display area and the second non-display area;

a stress-relieving member disposed on a rear surface of the display panel;

a first supporting member disposed on a rear surface of the display panel overlapped with the first non-folding area;

a second supporting member disposed on a rear surface of the display panel overlapped with the second non-folding area;

a third supporting member disposed on a rear surface of the first supporting member and extending to an area overlapped with the first non-display area; and a fourth supporting member disposed on a rear surface of the second supporting member and extending to an area overlapped with the second non-display area, wherein, in response to a folding of the display panel along a folding axis, the first and second non-display areas are bent to move end portions of the first and second non-display areas towards the third and fourth supporting members, respectively, and a bending direction of each of the first and second non-display areas is opposite to a bending direction of the folding area, the folding axis is overlapped with the folding area and is extended in a second direction.

25. The display device of claim 24, wherein an elastic strength of the stress-relieving member is greater than an elastic strength of the display panel.

26. The display device of claim 25, wherein, when the display panel is folded, a stress occurring in the display panel is greater than the elastic strength of the stress-relieving member.

* * * * *